UNITED STATES PATENT OFFICE 2,017,069

SYNTHESIS OF AMINES

Wilbur A. Lazier, Wilmington, Del., assignor to E. I. du Pont de Nemours & Company, Wilmington, Del., a corporation of Delaware No Drawing. Application February 6, 1931, Serial No. 514,055

22 Claims. (Cl. 260—127)

This invention relates to an improved catalytic process for causing dehydration reactions to take place with organic hydroxy compounds. More particularly the invention relates to an improved process for the synthesis of amines.

Active carbon has been used extensively as an absorbent and decolorizing agent but only a limited use has been made of active carbon impregnated with inorganic materials. As an instance of such a use there may be mentioned the utilization of active charcoal impregnated with copper oxide for gas adsorption. Carbon, or carbon impregnated with any inorganic material as herein disclosed, has not, in so far as I am aware, been heretofore employed for the direct synthesis of amines, or for any other purely dehydration reaction.

This invention has as an object a process for effecting a dehydration reaction with organic hydroxy compounds with substantial or total suppression of dehydrogenation.

Another object is an improved process for the direct synthesis of amines. Other objects will appear hereinafter.

These objects are accomplished by the following invention, which in its general aspects, comprises passing a vapor or a vapor mixture containing the organic hydroxy compound or compounds to be dehydrated over a heated catalyst comprising active carbon and a suitable dehydrating agent, preferably a dehydrating metallic oxide.

In the synthesis of amines, a reaction with which the application of the present invention is especially concerned, a vapor mixture of an alcohol and ammonia, or an amino compound having at least one reactive hydrogen atom attached to nitrogen, is passed over my improved catalyst at an elevated temperature. In the synthesis of amines from alcohols and ammonia, or in syntheses of like character, it is desirable to use a catalyst which will produce substantial yields of amines with a minium conversion to undesirable side products. There is always a tendency for the alcohol to dehydrogenate to aldehyde and hydrogen instead of to dehydrate with the ammonia to form amines. In addition there is the possibility of a competitive dehydration reaction not involving the ammonia and leading to the formation of ethers or unsaturated hydrocarbons. In the synthesis of methyl amines, where the ether is the only compound that can be formed by this reaction, the difficulty is not serious since dimethyl ether is the equivalent of methanol for the methyl amine synthesis. The higher alcohols, however, tend to form olefines by dehydration and these do not react with ammonia to form amines to any appreciable extent, and therefore the dehydrating side reaction must be suppressed. In my improved process for amine synthesis both the tendency towards dehydrogenation of the alcohols to form aldehydes and hydrogen and the tendency of the higher alcohols to dehydrate to unsaturated hydrocarbons are suppressed. This latter suppression does not occur, however, when ammonia or other bases are absent.

The carbon, which forms the support for the dehydrating agent, should have a rigid porous structure and should preferably contain no more ash (inorganic material) than is normally found in the best commercially available active carbon, about 1% to 5%. In carrying out my invention I prefer to use an active carbon prepared by the combustion of wood, preferably hard wood, which yields a charcoal of relatively low ash content and high activity. The activity of the charcoal is improved by heating at high temperatures in the presence of oxygen-containing gases, superheated steam, chlorine or other activating agents. This charcoal, after treatment with a suitable dehydrating oxide, is heated to a suitable reaction temperature and the organic compound or mixture containing organic compounds in vapor form is passed over the heated catalyst. Thus in the synthesis of amines a vapor mixture of ammonia and an alcohol reacts with the elimination of water and the formation of primary, secondary and tertiary amines. For a more detailed description of the methods by which my invention may be practiced, reference may be had to the following examples which are given by way of illustration and not as limitation.

*Example 1*

One-hundred and twenty-five cc. of activated charcoal weighing 45 grams and having an ash content of 1.1%, the alkalinity of which was 0.3% calculated as sodium, was heated four hours at 400° C. and exhausted at a pressure of less than 5 mm. After cooling to room temperature in a vacuum, the carbon was covered with 125 cc. of a solution containing 20 grams of crystallized aluminum nitrate per 100 cc. After allowing to stand for several hours, the excess solution was decanted off and the carbon dried at 100° C. It was then heated in a loosely covered vessel at 400° C. for two hours in order to convert the aluminum nitrate into aluminum oxide. After the impregnating process, the alumina content was 4.3%.

In employing this catalyst for the synthesis of butylamine, 50 cc. was loaded into a tube furnace which was heated to 325° C. and a mixture of the vapor of normal butanol and ammonia was passed over the catalyst at the rate of 40 cc. of liquid butanol and 23 grams of anhydrous ammonia per hour. After a four-hour run the excess ammonia was removed from the product by boiling through an efficient fractionating column and the product analyzed by fractional distillation. It was found that the condensate contained, in addition to a quantity of unconverted butanol, mono-, di-, and tributylamines, corresponding to a 5.3% conversion to monobutylamine and a 14.5% conversion to the di- and triamines, or a total conversion to butylamines of 19.8%. Gas losses caused by the dehydrogenation of the alcohol and the formation of butane and butylene amounted to about 3.0%.

*Example 2*

Fifty cc. of activated charcoal prepared from hard wood was soaked for eight hours in a solution of aluminum nitrate containing 14 g. of alumina per 100 cc. The charcoal was drained, dried, and ignited in a loosely covered vessel for two hours at 450° C. After cooling, the catalyst mass containing about 11% of $Al_2O_3$ was charged into a tube furnace and maintained at a temperature of 325° C., while a mixture of normal butanol vapor and ammonia was passed over it. The time of contact of the gaseous mixture with the catalyst was about 2.4 seconds and the ammonia-butanol ratio 2.5. Distillation of the product showed that 46.7% of the butanol had been converted to butylamines of which 17.9% had gone to form monobutylamine and the remainder, the di- and triamines. Gaseous decomposition of the alcohol to butane, butylene, and hydrogen amounted to about 4% of the butanol passed over the catalyst.

*Example 3*

A catalyst containing thoria on charcoal was prepared by outgassing at 400° in a vacuum a sample of activated wood charcoal containing between 1 and 2% ash and impregnating with an equal volume of a solution containing 20 g. of crystallized thorium nitrate per 100 cc. After drying, the impregnated carbon was ignited to convert the thorium nitrate to oxide.

When employed for the synthesis of butylamines under the conditions described in Example 2 above, this catalyst gave a total conversion of the butanol to amines of 41%, of which 32% was a mixture of the di- and triamines. The gas consisted almost wholly of hydrogen in contradistinction to the formation of butylene and butane usually observed when an alumina-on-charcoal catalyst is employed.

*Example 4*

An alumina supported on charcoal catalyst prepared exactly as described in Example 1 above was employed for the continuous gas phase synthesis of methylamines from a mixture of methanol and ammonia. Fifty cc. of the alumina-impregnated charcoal was heated at 340° C. while equal moles of ammonia and methanol were passed over it. The rate of flow was 25 cc. of alcohol per hour with the corresponding amount of ammonia. The total conversion to methylamines amounted to about 30% of the methanol. Of the fraction reacting about 40% was converted to monomethylamine, about 30% to dimethylamine, and about 30% to trimethylamine. The simultaneous formation of dimethyl ether amounted to about 10% of the methanol passed, with practically no decomposition to hydrogen, formaldehyde, or oxides of carbon.

*Example 5*

One liter of a 6–14 mesh alumina-impregnated activated charcoal containing 8.4% $Al_2O_3$ was loaded into an extra heavy aluminum lined tube. The mass was heated to 328° C. while a mixture of normal butanol vapor and ammonia was pumped over it at 200 lbs. pressure. The rate of alcohol flow was about 500 cc. per hour and the molecular ratio of ammonia to butanol about 1.5. Forty-five per cent of the butyl alcohol was converted to amines, the distribution being about 17% to monobutylamine, about 22% to dibutylamine, and about 6% to tributylamine. Gas production amounted to less than 8% of the alcohol passed thru the system.

A large variety of active carbons may be used for the preparation of the impregnated catalyst, provided the ash is of sufficiently low concentration and does not contain undesirable constituents. These carbons may be prepared synthetically as by dehydration of furfural or carbohydrates or by combustion processes. I prefer to use wood charcoal, but that obtained from nut shells is also suitable. "Active carbon" as well understood by those skilled in the art, refers to carbon having a greatly increased surface extension due to its high degree of porosity as compared to ordinary or inactive carbon.

Among the various methods used for the production of active carbon there may be mentioned the treatment of the carbon with steam at about 900° C. which oxidizes the hydrocarbons within the charcoal thereby leaving it in a highly porous and more active state.

A variety of methods may be used for the preparation of the impregnated charcoal such as treating the charcoal with a soluble salt of the metal followed by a precipitating agent, or soaking the charcoal in a colloidal solution or in any other suitable way. Preferably I use the vacuum impregnation method claimed in application, Serial No. 470,219, filed July 23, 1930 by H. R. Arnold and myself.

In addition to the alumina and thoria mentioned in the examples, other suitable catalytic dehydrating agents such as titania or various salt sand certain rare earth oxides, may also be used. Various phosphates and sulfates have been found to give small, though definite conversions. In some instances an agent may cause a high conversion of one lacohol into the corresponding amine while yielding a much less satisfactory conversion for another alcohol. Thus, aluminum phosphate or sulfate, while causing a high conversion of methanol to methylamines, is less suitable for the production of butylamines.

It is to be understood, however, that the novelty of the present invention resides in the discovery of the advantages resulting from the use of a catalyst comprising any suitable dehydrating agent mounted on an active carbon support as herein described, rather than in the selection of a particular dehydrating agent to be used with my improved carbon support. The percentage of oxides used on the surface of the carbon support may vary over wide limits. For example, from 1 to 10% of alumina on the charcoal may be used, but I prefer to use about 7%.

The conditions of conducting the reaction with my improved catalyst may be widely varied. Temperatures of about 325° C. have been indicated in the examples, but these may be varied as the individual case permits. Rates of flow may also be varied over a wide range. Ammonia is preferably used in excess of the amount theoretically required to react with the alcohol, but this, too, is not a rigid requirement. My improved catalysts are applicable when the process is conducted at ordinary, reduced, or superatmospheric pressures. In the case of the higher boiling alcohols, it may be desirable to conduct the process in a partial vacuum, while for the more volatile alcohols, increase in time of contact is gained through the use of pressure.

The impregnated carbon catalysts set forth herein may be employed for the direct synthesis of aliphatic and aromatic amines. For example, they are suitable for the preparation from methanol and ammonia of the various methyl-amines and for other aliphatic amines from ammonia and the corresponding alcohols such as ethylamines, propylamines, butylamines, hexylamines, and laurylamines. This particular catalyst, however, is especially useful for the synthesis of amines having more than one carbon atom in the alkyl group inasmuch as the tendencies of the alcohols to dehydrate to hydrocarbons are suppressed. Aromatic amines may be produced in the same manner as the aliphatic amines by using aromatic hydroxy compounds instead of aliphatic alcohols. Thus, a mixture of ammonia and phenol yields aniline. Secondary, tertiary, or mixed amines having different alkyl groups may also be produced by reacting a primary or secondary amine with an alcohol. The present process is useful for the alkylation of aromatic amines; for example, in the conversion of aniline to ethyl aniline by reacting aniline with ethyl alcohol. Amino compounds of polyhydric alcohols, such as glycerol, may be prepared by reacting the polyhydric alcohol with ammonia or an amine. My improved process for synthesizing amines includes, therefore, the reaction of amino compounds containing at least one reactive hydrogen atom attached to nitrogen with alcohols. The term "amino" as used herein in connection with the material passed over the catalyst refers therefore to a compound having an $NH_2$ or $NH$ group, and includes primary and secondary amines. Ammonia, of course, may be used in place of the amino compound. Thus, primary, secondary and tertiary amines may be produced by my improved process.

While my improved process is especially valuable for the production of amines, it is to be understood that in its broadest aspect the invention comprises the dehydration of organic hydroxy compounds for the production of dehydration products without the concomitant production of dehydrogenation products in undesirable amounts. Among the many dehydration reactions which may be carried out by my invention are the following: The dehydration of a mixture of alcohol and acid for the production of an ester, as for instance the formation of ethyl acetate from ethyl alcohol and acetic acid; the conversion of alcohols to the corresponding ethers, as for instance, methyl ether from methyl alcohol; the production in the absence of ammonia of olefines from the higher alcohols; the dehydration of an acid for the production of an anhydride, as for instance acetic anhydride from acetic acid; and the formation of inner anhydrides, as for example the dehydration of an acid molecule such as acetic acid for the production of ketene. For the purpose of the present invention ethers, (alcohols having the hydrogen of the hydroxyl group replaced by an alkyl group), may be considered as substituted alcohols or hydroxy compounds. Thus, dimethyl ether and ammonia, may by means of my improved catalyst, be made to react to form methyl amines.

My improved process may be used with advantage because of the high conversion to amines obtained. In addition, the catalysts used in the present invention are especially valuable because of the low losses to side products obtained by their use. For example, in the conversion of butyl alcohol to butylamine by the ordinary catalysts, very high losses to gaseous products are experienced. By use of a suitable carbon catalyst impregnating with a dehydrating oxide such as alumina, these losses are decreased to a minimum, resulting in a high final yield of the desired product from the alcohol used as a raw material. As illustrating the improved results accruing from the use of my improved catalyst, it may be noted that a pure alumina catalyst prepared by the ignition of aluminum nitrate when used for the preparation of butylamines under the same conditions described in Example 1, yielded a total conversion to amines of only 12.6% as compared to the 19.8% obtained with the alumina impregnated carbon catalyst.

The practice of the present invention is especially advantageous in connection with the synthesis of butylamines because the synthesis of these amines in prior processes have offered difficulties not encountered in methylamine synthesis. Thus, while methanol is dehydrated only to dimethyl ether, which is reactive with ammonia, butanol is subject to dehydration to butylene over the catalysts heretofore employed.

As many apparently widely different embodiments of this invention may be made without departing from the spirit and scope thereof, it is to be understood that I do not limit myself to the specific embodiments thereof except as defined in the appended claims.

I claim:

1. A process for producing amines which comprises passing the mixed vapors of a compound selected from the group consisting of alcohols and phenols and a compound selected from the group consisting of ammonia and amino compounds having at least one hydrogen atom attached to nitrogen over a heated catalyst comprising essentially a catalytic dehydrating agent supported on activated carbon.

2. The process of claim 1 in which the temperature is maintained between about 325° C. to about 340° C.

3. A process for producing amines which comprises passing the mixed vapors of a compound selected from the group consisting of alcohols and phenols and a compound selected from the group consisting of ammonia and amino compounds having at least one hydrogen atom attached to nitrogen over heated activated charcoal impregnated with a catalytic dehydrating agent.

4. A process for producing amines which comprises passing the mixed vapors of a compound selected from the group consisting of alcohols and phenols and a compound selected from the group consisting of ammonia and amino compounds having at least one hydrogen atom attached to nitrogen over a heated catalyst comprising essentially a dehydrating metal oxide supported on activated carbon.

5. The process of claim 4 in which the temperature is maintained between about 325° C. to about 340° C.

6. A process for producing amines which comprises passing the mixed vapors of a compound selected from the group consisting of alcohols and phenols and a compound selected from the group consisting of ammonia and amino compounds having at least one hydrogen atom attached to nitrogen over heated activated charcoal impregnated with alumina.

7. A process for producing amines which comprises passing the mixed vapors of an alcohol and a compound selected from the group consisting of ammonia and amino compounds having at least one hydrogen atom attached to nitrogen over a heated catalyst comprising essentially a catalytic dehydrating agent supported on activated carbon.

8. A process for producing amines which comprises passing the mixed vapors of an alcohol and a compound selected from the group consisting of ammonia and amino compounds having at least one hydrogen atom attached to nitrogen over a heated activated charcoal impregnated with a catalytic dehydrating agent.

9. A process for producing amines which comprises passing the mixed vapors of an alcohol and a compound selected from the group consisting of ammonia and amino compounds having at least one hydrogen atom attached to nitrogen over a heated catalyst comprising essentially a dehydrating metal oxide supported on activated carbon.

10. A process for producing amines which comprises passing the mixed vapors of an alcohol and a compound selected from the group consisting of ammonia and amino compounds having at least one hydrogen atom attached to nitrogen over heated activated charcoal impregnated with alumina.

11. A process of producing amines which comprises passing the mixed vapors of an alcohol and ammonia over a heated catalyst comprising essentially a catalytic dehydrating agent supported on activated carbon.

12. A process of producing amines which comprises passing the mixed vapors of an alcohol and ammonia over heated activated charcoal impregnated with a catalytic dehydrating agent.

13. A process of producing amines in which the mixed vapors of an alcohol and ammonia are passed over a heated catalyst comprising essentially a dehydrating oxide supported on activated carbon.

14. A process of producing amines which comprises passing the mixed vapors of an alcohol and ammonia over heated activated charcoal impregnated with alumina.

15. A process of producing amines which comprises passing the mixed vapors of an aliphatic alcohol and ammonia over a heated catalyst comprising essentially a catalytic dehydrating agent supported on activated carbon.

16. A process of producing amines which comprises passing the mixed vapors of an aliphatic alcohol and ammonia over heated activated charcoal impregnated with a catalytic dehydrating agent.

17. A process of producing amines which comprises passing the mixed vapors of an aliphatic alcohol and ammonia over a heated catalyst comprising essentially a dehydrating metal oxide supported on activated carbon.

18. A process of producing amines which comprises passing the mixed vapors of an aliphatic alcohol and ammonia over heated activated charcoal impregnated with alumina.

19. A process for producing butyl amines which comprises passing the mixed vapors of a butyl alcohol and ammonia over heated activated carbon impregnated with a catalytic dehydrating agent.

20. A process for producing butyl amines which comprises passing the mixed vapors of a butyl alcohol and ammonia over heated activated charcoal impregnated with alumina.

21. A process for producing methyl amines which comprises passing the mixed vapors of methyl alcohol and ammonia over heated activated carbon impregnated with a catalytic dehydrating agent.

22. A process for producing methyl amines which comprises passing the mixed vapors of methyl alcohol and ammonia over heated activated charcoal impregnated with alumina.

WILBUR A. LAZIER.

CERTIFICATE OF CORRECTION.

Patent No. 2,017,069.                                             October 15, 1935.

WILBUR A. LAZIER.

It is hereby certified that error appears in the printed specification of the above numbered patent requiring correction as follows: Page 3, second column, line 5, for "ketone" read ketene; and that the said Letters Patent should be read with this correction therein that the same may conform to the record of the case in the Patent Office.

Signed and sealed this 17th day of December, A. D. 1935.

Leslie Frazer (Seal)                                                   Acting Commissioner of Patents.